(No Model.)
J. GIBBS.
CATTLE STALL.
No. 369,333. Patented Sept. 6, 1887.
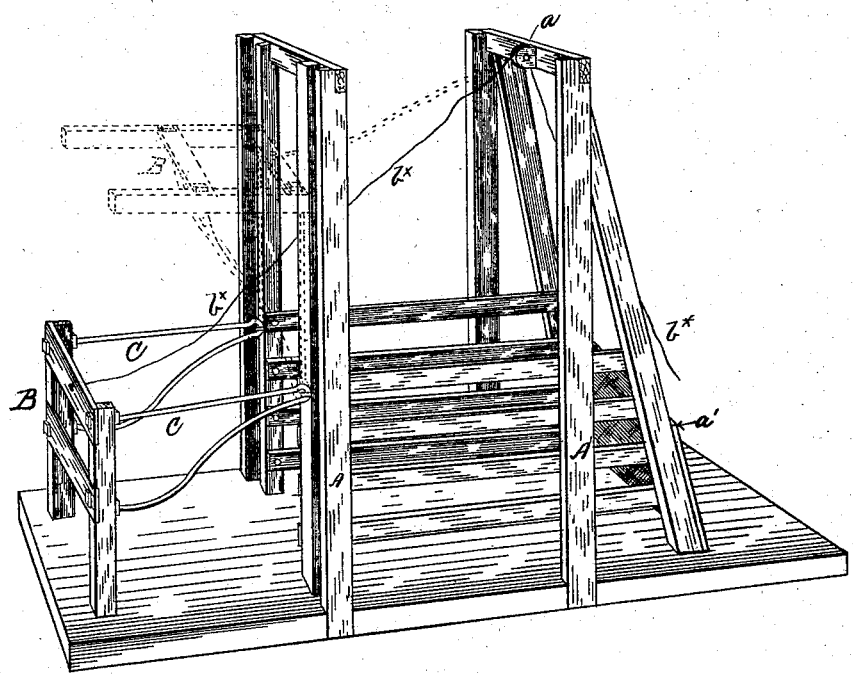
WITNESSES
INVENTOR
Jason Gibbs
By J. M. Kalb
Attorney

UNITED STATES PATENT OFFICE.

JASON GIBBS, OF FREMONT, OHIO.

CATTLE-STALL.

SPECIFICATION forming part of Letters Patent No. 369,333, dated September 6, 1887.

Application filed March 15, 1886. Serial No. 195,316. (No model.)

*To all whom it may concern:*

Be it known that I, JASON GIBBS, a citizen of the United States, residing at Fremont, in the county of Sandusky and State of Ohio, have invented certain new and useful Improvements in Cattle-Stalls; and I do hereby declare the following to be a full, clear, and exact description of the invention, such as will enable others skilled in the art to which it appertains to make and use the same.

My invention relates to cattle-stalls.

A stall built according to my invention possesses many advantages over the ordinary means for securing cattle in stalls. The fixed portion of the stall is made only part length and the gate is held upon hinged arms, which bring it, when closed, at a considerable distance back of the fixed portion of the stall, so that when an animal projects its head into the stall with the gate raised the gate can at once be lowered and the animal will be secured in the stall. This is a point of very great advantage in securing timid or rebellious stock. When the animal is inclosed by the dropping of the gate, no tying or other securing is required, as he is fenced in on all sides. This enables me to do away with halters, and at the same time gives the animal a degree of liberty which he could not have if tied, and it accustoms an animal unused to stabling to restrictions without arousing his fears.

In order to render the front of the stall capable of holding the animal and still permitting him to protrude his head to get provender, I preferably make said front inclined backward, by reason of which inclination it need not be carried up so high as the perpendicular sides and back.

The arms above referred to as sustaining the gate are hinged to the rear of the fixed portion of the stall, and a rope or other means for giving purchase is secured to the top of the gate and passed over one or more pulleys secured upon the upper portion of the stall or at some point overhead, by means of which the gate is lifted or dropped.

The invention will be more particularly set out in the following detailed description and pointed out in the claims.

The accompanying drawing illustrates what I consider the best means for carrying my invention into practice.

The figure represents a perspective view of the device.

Similar letters of reference indicate corresponding parts.

A is the fixed portion of the stall, to the top of which is fastened the pulley or pulleys $a$. This stall has an inclined front provided with a board or protector, $a'$, which prevents the animal from getting out in that direction.

The lift gate or frame B is formed in any convenient manner, and is joined to the fixed portion of the stall by means of arms $c$, which form two sides of said gate or frame, and are hinged to the rear portion of the stall in any suitable manner. When the animal is to be driven into the stall, the gate is elevated, as shown in dotted lines in the figure, and when he is partially or entirely in, the gate is lowered, as shown in full lines in the figure. By means of a rope, $b^\times$, fastened to the top of the gate or frame B and passing over the pulley or pulleys $a$, both the lifting and lowering of the gate are accomplished. This rope extends to the front of the stall, so that it can be seized by the hand either from the front or side.

As shown in the drawing, I have made the arms $c$ of metal rods or bars, which are held to the gate by nuts, and are simply bent through an eye on the rear of the fixed portion of the stall and then run back to the gate in a downwardly-inclined direction, which not only serves to brace the gate, but also affords means for preventing the escape of the animal; but it is evident that the arms can be made of wood, and other means of hinging them to the rear of the stall can be employed.

Having thus described my invention, what I desire to claim and secure by Letters Patent is—

1. A cattle-stall consisting of the fixed portion A and the gate B, having long arms $c$, which are hinged to the fixed portion, and which hold the gate at a distance from the fixed portion and close the space between when the gate is let down, and which cause the gate to rise well up out of the way when raised, as set forth.

2. A cattle-stall consisting of the fixed portion A, gate B, having long arms c, hinged to the fixed portion A, and means, substantially as described, for elevating and lowering the gate from the front of the stall, as set forth.

In testimony whereof I affix my signature in presence of two witnesses.

JASON GIBBS.

Witnesses:
E. F. DICKINSON,
H. J. KRAMB.